(12) United States Patent
Kothnur et al.

(10) Patent No.: US 7,530,780 B2
(45) Date of Patent: May 12, 2009

(54) METHOD AND APPARATUS FOR WIND POWER FOUNDATION

(75) Inventors: Vasanth Srinivasa Kothnur, Clifton Park, NY (US); David Deloyd Anderson, Glenville, NY (US)

(73) Assignee: General Electric Company, Schenectady, NY (US)

( * ) Notice: Subject to any disclaimer, the term of this patent is extended or adjusted under 35 U.S.C. 154(b) by 365 days.

(21) Appl. No.: 11/438,792

(22) Filed: May 22, 2006

(65) Prior Publication Data
US 2007/0269272 A1 Nov. 22, 2007

(51) Int. Cl.
*E21B 17/01* (2006.01)
(52) U.S. Cl. .................. 415/4.3; 415/4.5; 415/908; 416/244 R; 416/DIG. 6
(58) Field of Classification Search .................. 415/4.3, 415/4.5, 908; 416/244 R, DIG. 6
See application file for complete search history.

(56) References Cited

U.S. PATENT DOCUMENTS

| | | | |
|---|---|---|---|
| 6,299,384 B1 * | 10/2001 | Glasscock et al. | 405/227 |
| 7,155,875 B2 * | 1/2007 | Henderson | 52/741.15 |
| 7,198,453 B2 * | 4/2007 | Hall | 415/4.3 |
| 7,238,009 B2 * | 7/2007 | Schellstede | 416/244 R |
| 7,276,808 B2 * | 10/2007 | Weitkamp et al. | 415/4.2 |
| 2006/0120809 A1 * | 6/2006 | Ingram et al. | 405/195.1 |

FOREIGN PATENT DOCUMENTS

| | | | |
|---|---|---|---|
| DE | 10226996 A1 * | 4/2003 | |
| DE | 10339438 A1 * | 4/2005 | |
| WO | WO 2004/055272 | 7/2004 | |
| WO | WO 2005/040605 | 5/2005 | |

OTHER PUBLICATIONS

"Cost Estimating Offshore Foundations—Lessons Learned From the LIPA Proposal", *Tetra Tech Fw, Inc.*, 4.

"Long Island Power Authority Offshore Wind Park Conceptual Foundation Design Report", *Bluewater Wind LLC.*, Rambä?L L Bredeve J 2 DK-2830 V Irum Tel +45 4598 6000 Fax +45 4598 6934,(Apr. 2003), 111 pages.

"Offshore Structures", *Offshore Minerals Management Technology Assessment & Research*, www.mms.gov/tarprojectcategories/Structur.htm Downloaded Apr. 19, 2006,1-10.

"Offshore Wind Energy—Opportunities & Challenges of the 21st Century", *Deep Water Offshore Wind Energy Workshop*, GE Wind Energy, (2003), 12.

(Continued)

*Primary Examiner*—Igor Kershteyn
(74) *Attorney, Agent, or Firm*—Blakely, Sokoloff, Taylor & Zafman LLP

(57) ABSTRACT

An apparatus and method for a wind power foundation. An embodiment of a wind power plant includes a tower having a top and a bottom. The plant also includes an assembly, the assembly including a transition piece that is coupled with a concrete cap. The assembly has a top and a bottom, with the top of the assembly being coupled with the bottom of the tower. The plant also includes a jacket structure. The jacket structure has a top and a bottom and multiple legs, with the bottom of the assembly being coupled with the top of the jacket structure.

19 Claims, 9 Drawing Sheets

OTHER PUBLICATIONS

"The Application of Suction Caisson Foundations to Offshore Wind Turbines—Extrancts From a Proposal to the DTI", Participants: SLP Engineering, Shell Renewables, Enron Wind Overseas Development, Fugro, Aerolaminates, Garrad Hassan,7.

"Zentech, Inc. Brouchure", 12.

Brennan, Skip, "Offshore Wind Energy Resources", *Deep Water Offshore Wind Energy Workshop*, AWS Scientific, Inc,9.

Byrne, B. W., et al., "Foundations For Offshore Wind Turbines", *The Royal Society*, Department of Engineering Science, University of Oxford, (Nov. 4, 2003),2909-2930.

Byrne, B. W., et al., "Investigating Novel Foundations For Offshore Windpower Generation", *Proceedings of OMAE'02. 21st International Conference on Offshore Mechanics and Arctic Engineering.* OMAE2002-28423,(Jun. 23, 2002), 1-10.

Duan, Zhongdong, et al., "Investigation of ISC Forces on Jacket Platform Structures: In-Situ Measured Data on JZ20-2-1 Platform in the China Bohai Sea", *15th ASCE Engineering Mechanics Conference*, (Jun. 2, 2002),1-7.

Fulton, Gordon, et al., "Mobile Deep Water Wind Turbine Support Platform", *CMA.* (Oct. 15, 2003),8.

Goldman, Peter, "Offshore Wind Energy", *Deep Water Technology Workshop*, (Oct. 15, 2002),7.

Hannevig, Dan, et al., "Low Cost Self-Installing Offshore Wind Turbine Support Structures For Deeper Water", Ocean Synergy Ltd,7.

Henderson, Andrew R., "Support Structures For Floating Offshore Windfarms", *NREL/DOE Seminar* Washington, USA, (Oct. 15, 2003),9.

Houlsby, G. T., et al., " Novel Foundations For Offshore Wind Farms", *Research Proposal to EPSRC*, (Aug. 2001),1-9.

Irvine, J. H., et al., " Improving the Lateral Stability of Monopile Foundations", *Civil Engineering and Geosciences—Research*, www.ceg.ncl.ac.uk/Research/Pubdetail.aspx?id=897, (2003),2.

Maniar, Dilip R., et al., "Simulation of Suction Caisson Behavior During and After Installation in Normally Consolidated Soil", *16th ASCE Engineering Mechanics Conference University of Washington*, Seattle, (Jul. 16, 2003), 1-9.

Manwell, J. F., et al., "External Conditions and Offshore Wind Energy in the US", *Workshop on Deep Water Offshore Wind Energy*, (Oct. 15, 2003),12.

Mercier, Rick, "Experience with Fixed and Floating Platforms for the Oil & Gas Industry", *Offshore Technology Research Center*, 14.

Musial, Walt, "Prospects for Deep Water Wind Energy Platforms", *Workshop on Deep Water Offshore Wind Energy Systems*, (Oct. 15, 2003), 10.

Palo, Paul, "Dynamics and Anchoring of Innovative Marine Structures", *Navfac*, Overview: Deep Water Wind Power Systems, (1991),7.

Quarton, David, et al., "An International Design Standard For Offshore Wind Turbines", *Garrad Hassan*, 13.

Shumucker, Douglas G., "Near-Failure Behavior of Jacket-Type Offshore Platforms in the Extreme Wave Environment", *A Dissertation Submitted to teh Department of Civil Engineering and the Committee on Graduate Studies of Stanford University*,(Jun. 1996), Title-261.

Zaaijer, Michiel B., "Comparison of Monopile, Tripod, Suction Bucket and Gravity Base Design for A 6 MW Turbine", *Delft University of Technology, Section Wind Energy*, (Apr. 2003), 15.

European Search Report mailed Nov. 14, 2007, European Application No. 07108406.5-2303, 8 pages.

Kerr D., "Support Structures for an Offshore Array of Vertical Axis Wind Turbines—A Design Study", Wind Engineering, Brentwood, GB, vol. 10, No. 1, 1986, pp. 47-61, XP001014352; ISSN: 0309-524X.

* cited by examiner

METHOD AND APPARATUS FOR WIND POWER FOUNDATION

FIELD OF THE INVENTION

The invention relates to wind power plants in general. More particularly, the invention relates to a foundation for a wind power plant.

BACKGROUND

Wind power continues to grow as a source of electricity because of its potential to provide abundant, pollution-free power. Demand for this alternative energy source is expected to increase because of concerns regarding reductions in fossil fuel supplies, the impact of traditional energy sources on the environment, and the increasing need for electric power throughout the world.

As the use of wind power increases, more questions have arisen regarding the placement of wind power plants. For all of the benefits of wind power, it is clear that wind power conventionally requires a large amount of real estate for placement of plants. As an alternative to land-based wind power generation, wind power plants have been placed off-shore in ocean waters, thereby making use of offshore winds while not requiring any land for placement.

However, the establishment of offshore wind power generation introduces new factors. An offshore wind power plant requires a foundation that will withstand the combination of the lateral stresses that are inherent in wind generation together with the additional forces of waves and currents in an offshore environment. If wind power plants are established farther offshore, the deeper waters may result in an increase in intensity for these natural forces. In addition to creating greater forces in operation, the placement of wind power plants farther off-shore creates a more complex environment for plant construction, with much of the plant foundation being deep underwater.

BRIEF DESCRIPTION OF THE INVENTION

A method and apparatus for a wind power plant foundation is presented.

In a first aspect of the invention, an embodiment of a wind power plant includes a tower having a top and a bottom. The plant also includes an assembly, the assembly including a transition piece that is coupled with a concrete cap. The assembly has a top and a bottom, with the top of the assembly being coupled with the bottom of the tower. The plant also includes a jacket structure. The jacket structure has a top and a bottom and multiple legs, with the bottom of the assembly being coupled with the top of the jacket structure.

BRIEF DESCRIPTION OF THE DRAWINGS

The invention is illustrated by way of example, and not by way of limitation, in the figures of the accompanying drawings in which like reference numerals refer to similar elements.

DETAILED DESCRIPTION

Figure 1:
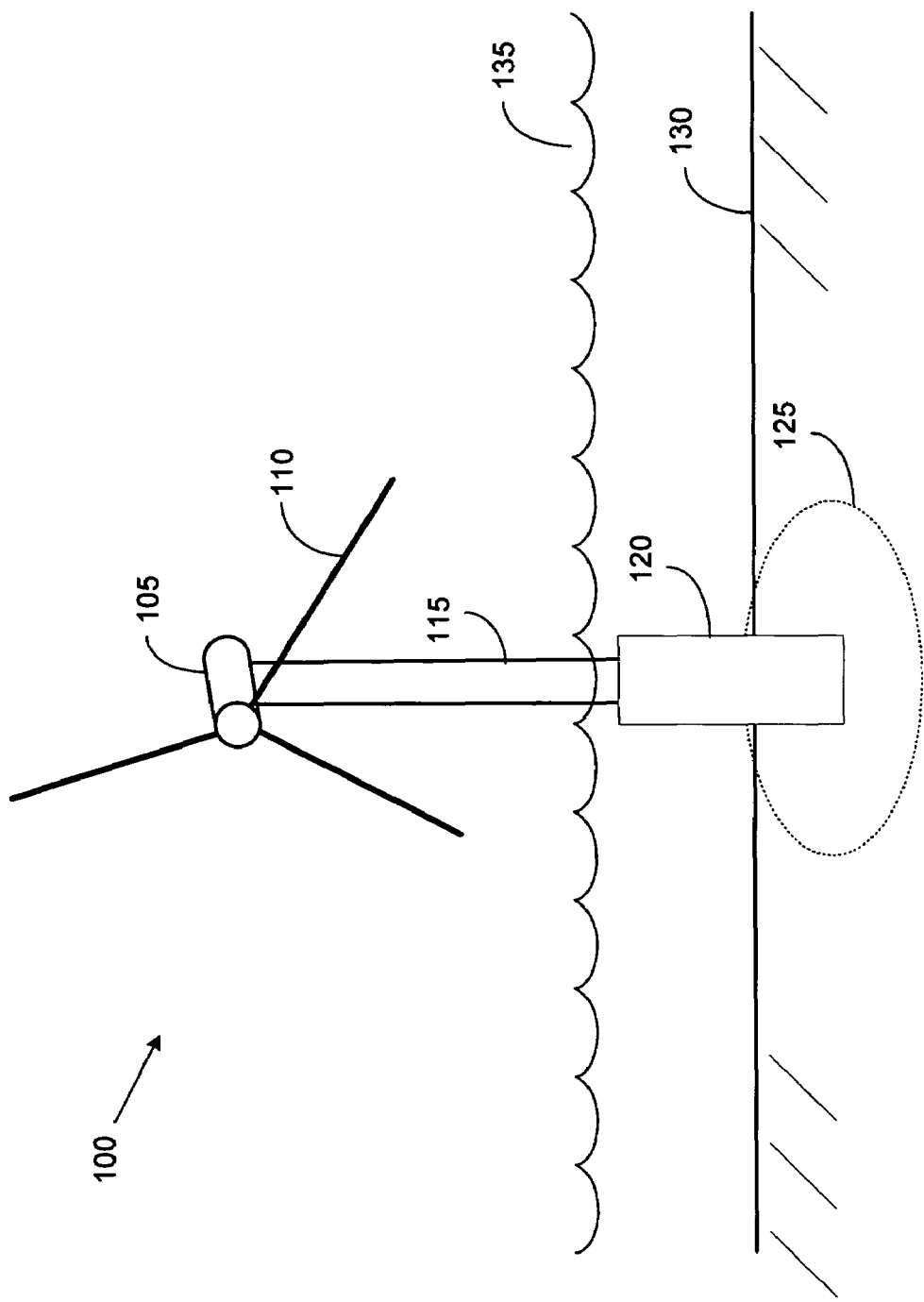
FIG. 1 is an illustration of an embodiment of a wind power plant.

In an embodiment of the invention, a method and apparatus for a wind power plant foundation is disclosed.

For the purposes of this description:

"Wind power plant" means a structure to generate electrical power from wind energy. A wind power plant may also be referred to as a wind power turbine. A wind power plant may include any type of component to capture wind energy, including a rotor and rotor blades.

"Foundation" means all or a part of a structure intended to hold up a wind turbine in place. For instance, an off-shore wind power turbine may include a foundation that is intended to hold the turbine above the water surface. A foundation may include a base or pad at the ground surface and/or penetrating therein and intervening sections coupled with a, the tower being a section that, among other purposes, provides the needed height for the wind power turbine. In one example, a foundation may be placed or installed in a body of water to hold a wind power turbine in place. A tower may be coupled with the foundation to hold a wind power turbine at a desired location. In this example, a foundation is wholly or partially below the surface of the water, depending on the particular implementation.

A "Pile" is a length of material to be driven into the earth. A pile may include a cylinder or other shape and may be made of any material, including metal.

"Concrete" means any mixture of aggregate (rocks, sand, gravel), water, and a binder. The binder is commonly cement. The elements of concrete are provided in certain proportions to harden to a strong consistency. For the purposes of this disclosure, the term concrete includes reinforced concrete, which is generally concrete to which some reinforcement or strengthening material has been added. Reinforced concrete may include, but is not limited to, metal or fiber reinforcement, including common metal bar ("rebar") reinforcement.

"Cement" means a material, usually in powdered from, that develops adhesive qualities when combined with water.

"Jacket" or "jacket structure" means a metal lattice intended to support a platform. A jacket may commonly support an offshore platform, which may be referred to as a jacket platform. A jacket generally includes multiple legs and braces, which may include multiple horizontal, vertical, or diagonal crossbeams, to form the lattice structure and to provide strength and rigidity in the structure.

Off-shore wind power plants are subjected to numerous forces. If the size of an offshore wind power plant is increased for overall cost effectiveness, the forces on the structure can increase, thereby increasing the load on the foundation. In addition, forces may also potentially increase if the wind power plant is established farther offshore, such as when near shore placements for a location are exhausted, or in deeper waters.

A foundation suspends a wind power turbine, the foundation being a means for holding the turbine and being wholly or partially submerged in water when installed. Under an embodiment of the invention, a foundation for an offshore wind power plant includes a concrete platform, or concrete cap. In an embodiment of the invention, a transition piece made primarily of metal, or metal and concrete, is coupled with the concrete cap to form an assembly. The transition piece/concrete cap assembly may be produced onshore in climate-controlled conditions and then be transported to the turbine location for installation. In an embodiment, the assembly is coupled to and suspended on a jacket structure or similar metal structure. In an embodiment, the jacket structure includes multiple legs, the legs expending generally from the top of the structure to the bottom of the structure. In an embodiment of the invention, the concrete cap and the jacket structure are coupled by one or more of the legs passing at least partly through the concrete cap. In an embodiment of the invention, a flanged connection is used to mount the concrete pad on the top of the jacket, the legs of the jacket running through the flange into or through the concrete cap. In an embodiment, a tower is installed on the foundation, and a wind turbine is installed on the tower, the wind turbine being a means for producing electrical power from wind energy.

In an embodiment of the invention, a wind power plant may be installed in a desired location by constructing all or a part of the foundation at another location, transporting the foundation to the installation location, and placing the foundation into the desired location. Once the foundation is in place, the construction of the wind power plant may be completed, which may include the installation of the wind power turbine on the tower. The installation process may thus be quicker and simpler than conventional processes.

An embodiment of a wind turbine may be secured in a location in a variety of different manners using different base structures, with the manner depending on the particular location and conditions. An embodiment may be secured using any known method of securing a jacket structure in a location. The base provides a means for holding the wind power plant in place.

In a first embodiment, a jacket structure supporting a wind turbine plant is secured by one more piles driven through the legs of the jacket structure into the earth surface. In this embodiment, the legs of the jacket structure are hollow sleeves, such as pipe-like structures, through which a pile may be inserted. The jacket structure may be placed in the appropriate location for the wind turbine plant, with the piles inserted through the leg sleeves of the jacket structure and driven into the earth.

In a second embodiment, a jacket structure supporting a wind turbine plant is secured by a concrete pad or similar gravity base. The concrete pad may be referred to as a gravity base structure (GBS). A GBS secures a structure using the mass of the base structure. In an embodiment, the bottom portions of the legs of the jacket are run at least partially through the GBS. The legs of the jacket may be secured by a flanged connection, each leg running through the flange into the GBS.

In a third embodiment, a jacket structure supporting a wind turbine plant may be secured by multiple concrete pads or GBSs. For example, the bottom portion of each leg of the jacket may run partially or wholly through a concrete pad. Each leg may be secured by a flanged connection, the leg running through the flange into the concrete pad.

In an embodiment of the invention, the load transfer of a wind power turbine is modified to increase the strength and resiliency of a base structure. In certain types of structures, a load on a tower is transferred to a concrete section, and then is transferred directly to the soil. While the concrete cap may provide a good physical connection to the tower, the concrete cap may not effectively transfer the load to the soil, and may create concentrations of stress in the structure. In another example, a wind turbine supported by a jacket structure may better transfer load forces, but the jacket does not provide an optimal coupling with the tower. In an embodiment of the invention, the advantages of coupling a tower with a concrete cap are combined with the load transfer capabilities of a jacket structure. In this embodiment, the loads encountered by the wind turbine tower are transferred from the tower to a transition piece/concrete cap assembly. In an embodiment, the foundation allows the dispatching load while avoiding stress concentrations, which is of great importance because the fatigue lifespan of a structure is critical in the design of an offshore structure. The loads encountered by the jacket assembly are then transferred to the base structure, such as a GBS or piles driven into the earth, and then to the soil.

In an embodiment of the invention, a wind turbine is supported by a structure that provides effective support in deep waters. A concrete GBS may provide a sufficient structure in more shallow waters, but the size and weight of the GBS will become extremely large in deep waters. In an embodiment of the invention, the amount of concrete required for the wind power turbine foundation may be greatly reduced by providing a jacket structure as an intermediary between the concrete cap and the base of the foundation. In addition, the jacket structure allows for reduction in wave loading because of its lattice structure, while the advantages of the coupling between the tower and the concrete cap are retained. In an embodiment, the lattice structure of the jacket may used to provide needed stiffness, support, and lateral strength to handle the significant wind and wave loading forces that may be encountered in deep water wind turbine installations.

If a wind power plant is placed in a deep offshore location, then stresses on the foundation of a wind power turbine include not only lateral stresses caused by the wind, but also include considerable stresses from the water environment. The water stresses include wave pressures and current pressure. Further, the multiple stresses on a wind power plant in an offshore location may come from different directions simultaneously and may shift directions quickly. In an offshore marine environment, a wind turbine may potentially experience extreme conditions, including winds reaching hurricane-force and waves that may approach tsunami waves. In an embodiment of the invention, a foundation utilizing a transition piece/concrete cap assembly coupled with a jacket structure may provide secure coupling for a wind power tower, effective transfer of the loads encountered in the environment, and simplified construction for deep water installation.

While this description refers to placement of a wind power plant offshore, embodiments of the invention are applicable to any wind power plant that is located in water locations, including an ocean, lake, man-made reservoir, or river.

FIG. 1 is an illustration of an embodiment of a wind power plant. In this simplified illustration, the wind power plant 100 includes a rotor 105 and one or more rotor blades 110. While this illustration shows a common rotor and rotor blade apparatus, embodiments of the invention are applicable to any type of wind power plant design, which may include various structures and components that are designed to capture wind power. In this illustration, the wind power plant 100 also includes a tower 115 to suspend the rotor 105 and rotor blades 110. The wind power plant 100 also includes a foundation 120 to support the tower 115, with the foundation potentially including multiple sections. The foundation 120 is attached to a base or pad structure 125 to secure the wind power structure in a location. In this illustration, the wind power plant 100 is installed in the earth 130 (through the mudline below the surface of water 135 (LAT). The wind power plant may be placed in deep waters offshore.

In an embodiment of the invention, the foundation 120 is constructed to provide good coupling with the tower 115 while also providing effective load transference to the earth surface 130. In an embodiment, the foundation 120 includes an assembly, the assembly including a concrete cap coupled with a transition piece for coupling with the tower. In an embodiment, the foundation 120 further includes a jacket structure, the assembly to be coupled with the jacket structure. The jacket structure is then coupled with the base 125 of the wind power plant 100. Embodiments of the foundation 120 are further illustrated in the other drawings.

Figure 2:
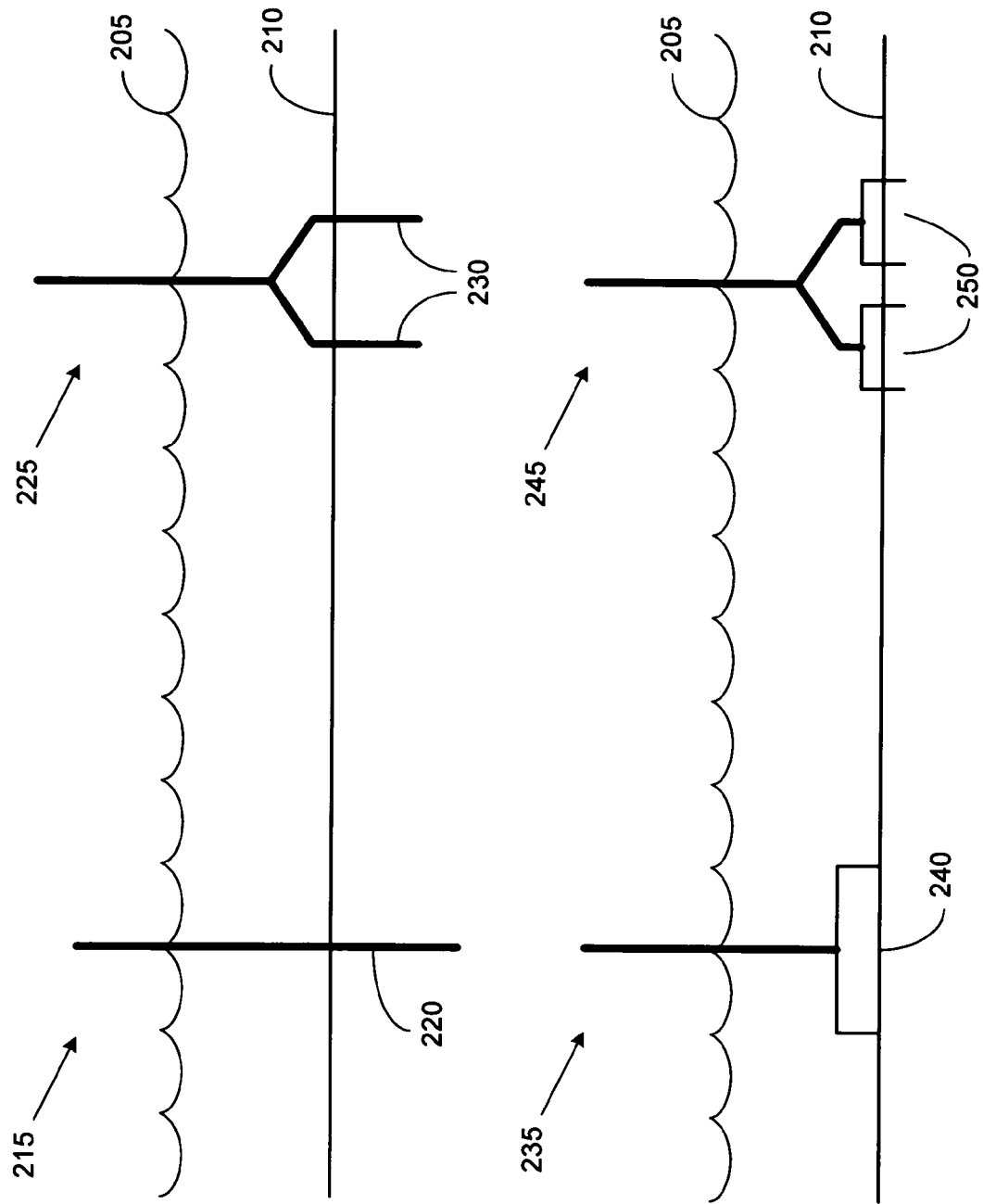
FIG. 2 is an illustration of possible base structures for an embodiment of a wind power plant.

FIG. 2 is an illustration of possible base structures for an embodiment of a wind power plant. In this illustration a wind power plant is installed below the surface of the water 205 in the seabed 210. A base structure may include a monopile 215, such as a pipe or column structure that is drilled or otherwise driven into the ground. A pile 220 may be a column made of a material such as steel or concrete that is driven into the ground to provide support for a structure, but may be made of any material. Conventional offshore structures have often utilized monopile foundations, but such structures are expensive to install, with the cost increasing as the wind power plant is increased in size or placed further offshore. A pile base may also include a multiple pile base 225, with multiple piles 230 being driven into the seabed 210. FIG. 2 also illustrates a gravity base 235 including a gravity base structure (GBS) or ballast base 240, which is a heavy base structure that used the force of gravity to keep the base in place. The size of the foundation may be limited by forces on the base and the stability of the structure.

FIG. 2 further illustates a suction base 245, which includes one or more Caissons or chambers 250 that placed on the seabed and installed using suction or vacuum Forces, such as by pumping the water out of the chamber. The chambers, commonly known as caissons or suction caissons, are watertight chambers that are open on the bottom, resembling a can that is opened on one end and is filled with water and placed open side down. This structure may be also referred to as a bucket foundation. A suction foundation may be installed relatively quickly in comparison with pile foundations.

Figure 3:
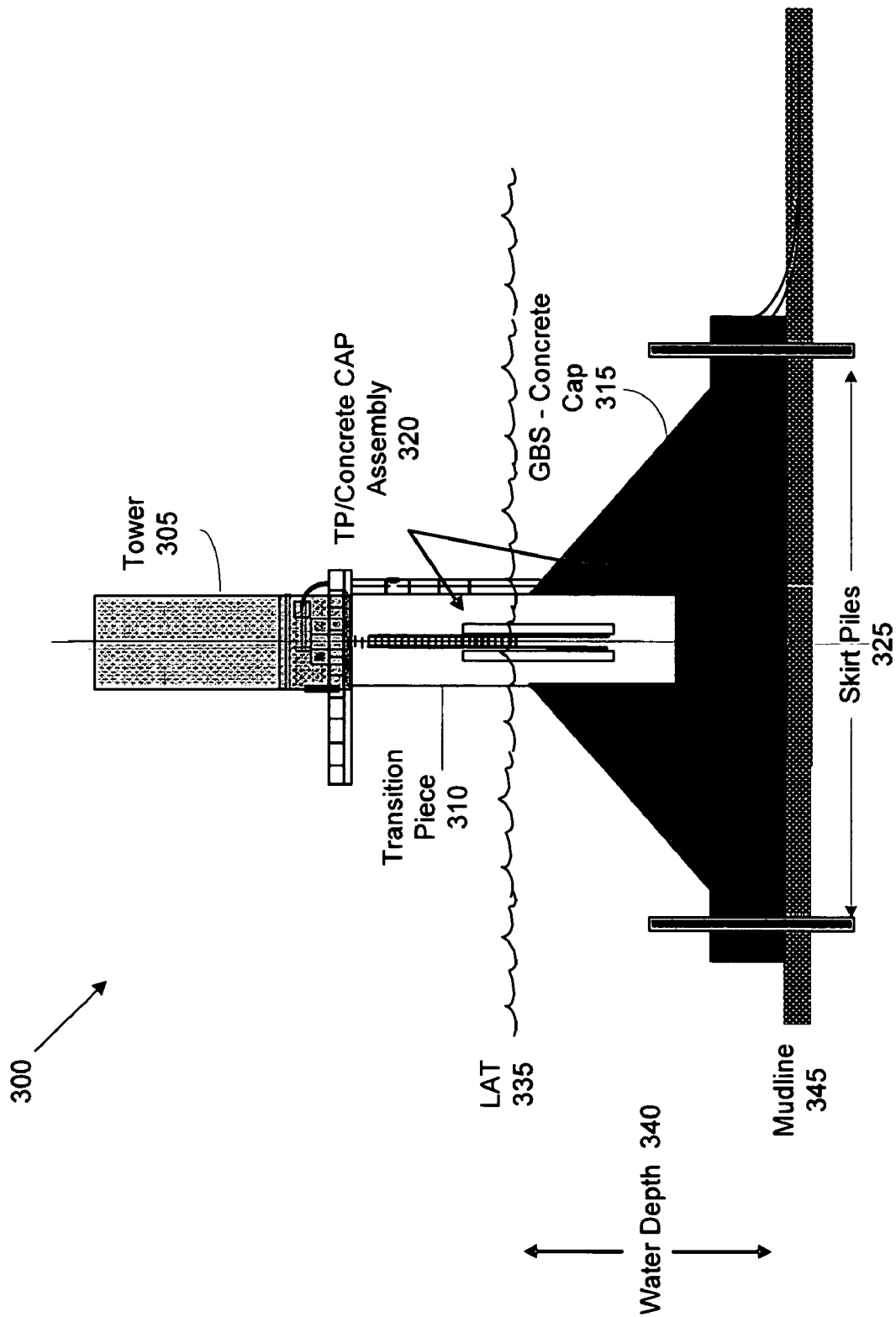
FIG. 3 is an illustration of an embodiment of a GBS foundation for a wind power plant.

FIG. 3 is an illustration of an embodiment of a GBS foundation for a wind power plant 300. In this illustration, a tower 305 is mated to a steel or steel/concrete transition piece 310 that transfers the loads to the concrete (generally with steel rebar reinforcement) base, referred to here as the GBS or concrete cap 315. The transition piece 310 and the concrete cap 315 may form an assembly 320 that may be fabricated together. In an embodiment of the invention, piles 325 may optionally be driven through the outer portion or "skirt" of the GBS 315 to increase lateral load capacity. Such piles 325 may be referred to as "skirt piles", which generally refers to smaller diameter piles driven at the bottom of a structure, including a jacket-type structure, to secure the structure to the soil. "Skirt piles" may specifically refer to small-diameter piles driven around the circumference of a GBS-type foundation to prevent sliding of the foundation. In addition to concrete, the GBS 315 may include cavities into which rock can be placed to increase foundation weight. The GBS may be fabricated onshore, which could potentially include inclusion of a lower portion of the tower section 305 and wind turbine components housed therein. The components may then transported to a site that has been prepared and leveled to receive the GBS and installed. However, the illustrated wind power plant 300 is placed in relatively shallow water depth 340 from the LAT 335 to the mudline 345.

Figure 4:
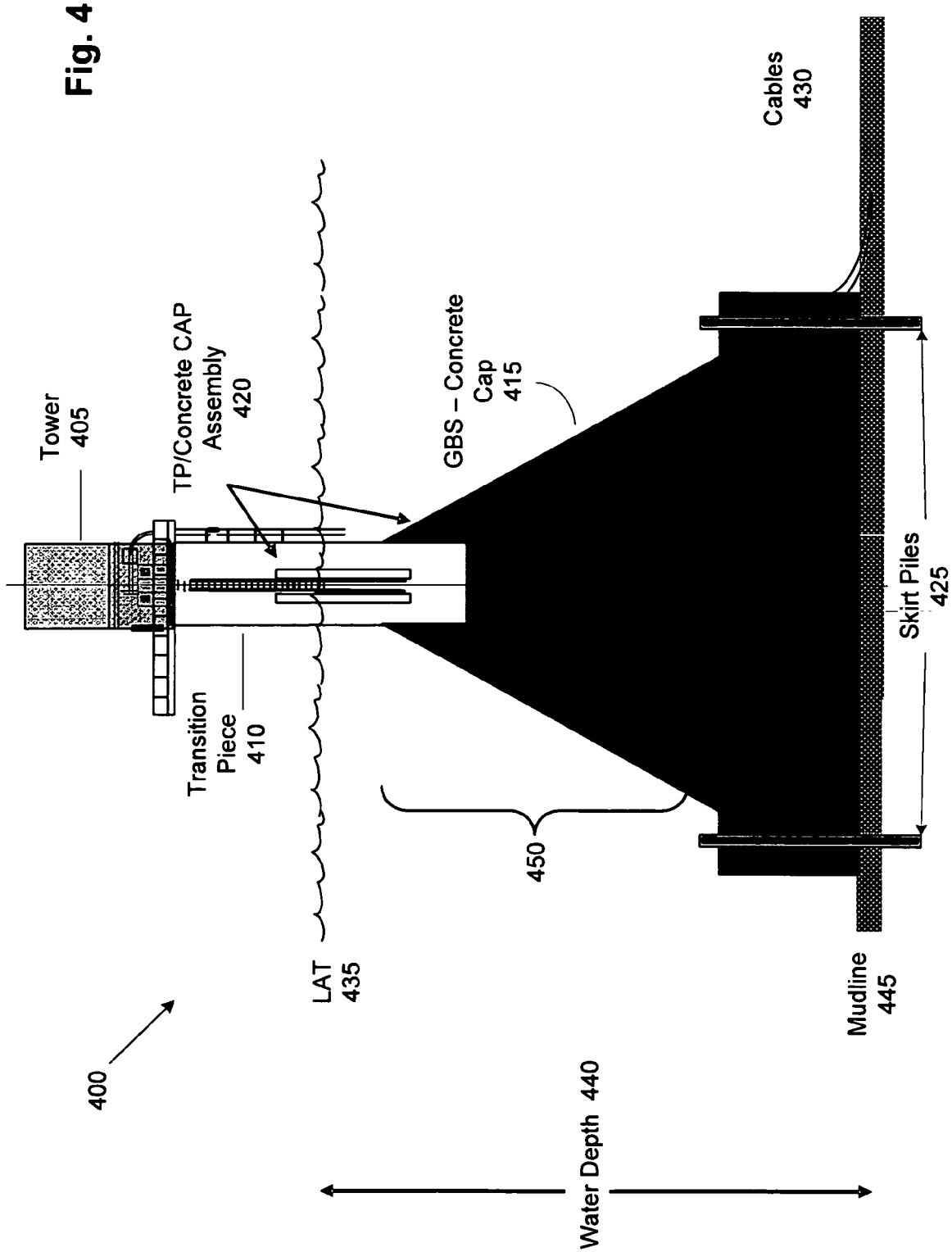
FIG. 4 is an illustration of an embodiment of a GBS foundation for a wind power plant in a deep water installation.

FIG. 4 is an illustration of an embodiment of a GBS foundation for a wind power plant 400 in a deep water installation. In this illustration, a tower 405 is again mated to a steel or steel/concrete transition piece 410 that transfers the loads to the concrete (with steel rebar reinforcement) GBS 415, the transition piece 410 and concrete cap 415 forming an assembly 420. Skirt piles 425 may be optionally used to increase lateral load capacity and cables 430 may enter the GBS. In this illustration the wind power plant 400 is placed in a relatively deep water depth 440 from the LAT 435 to the mudline 445. Because of the depth, the GBS 415 is required to be large with a wide base for stability, thus requiring a great amount of concrete and creating a very heavy structure. A portion 450 of the GBS 415 may be modified to improve the structure, such as providing an "inverted wine glass" shape that provides more mass at the bottom of the structure, while providing a relatively thinner portion to attach to the transition piece 410. Further, the GBS may be hollow in part to allow flooding with water. However, the GBS 415 remains very large, and will be more difficult to fabricate offshore for transport to the desired location than smaller bases for shallow water installations.

Figure 5:
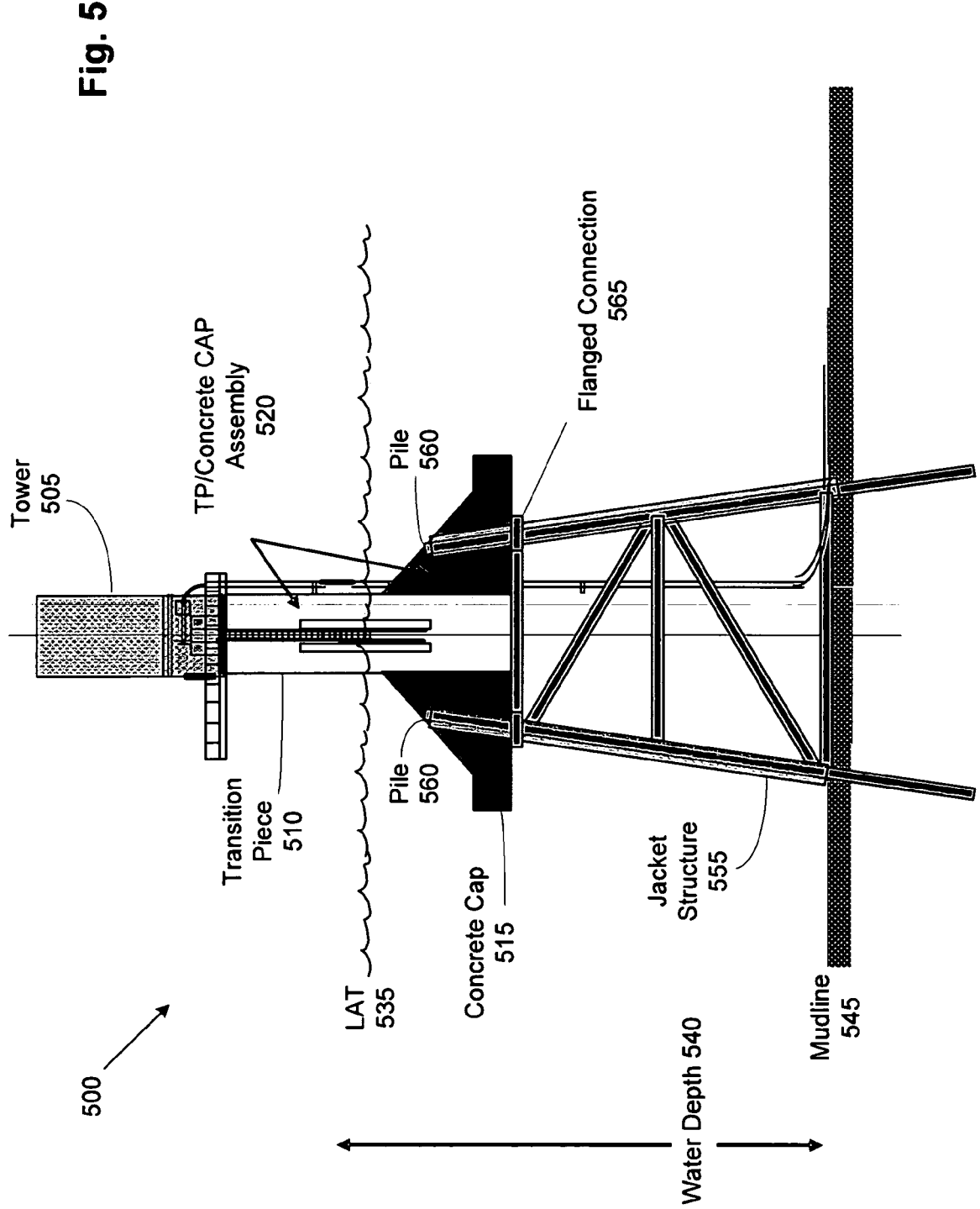
FIG. 5 is an illustration of an embodiment of a wind power plant foundation with a pile base.

FIG. 5 is an illustration of an embodiment of a wind power plant foundation with a pile base. In this illustration, a tower 505 of a wind power plant 500 is mated to a steel or steel/concrete transition piece 510 that transfers loads to a concrete cap (with steel rebar reinforcement) 515, the transition piece 510 and concrete cap 515 forming an assembly 520. In this illustration, the assembly 520 is relatively small and may be assembled as a unit and transported to an installation site with less difficulty than larger concrete bases. The assembly 520 is coupled with a jacket structure 555, allowing the transfer of loads from the concrete cap 515 to the metal lattice of the jacket structure 555. The concrete cap 515 may include flanged connections 565 to accept insertion of the tops of the legs of the jacket structure 555 into the concrete cap 515. In an embodiment, the wind power plant 500 is secured by a pile base, formed by the piles 560 being driven through the legs of the jacket structure 555 into the earth. In this illustration the wind power plant 500 may placed in a relatively deep water depth 540 from the LAT 535 to the mudline 545, with the assembly 520 and the jacket structure forming a foundation with a secure mounting for the tower while also providing effective load transference to the soil.

Figure 6:
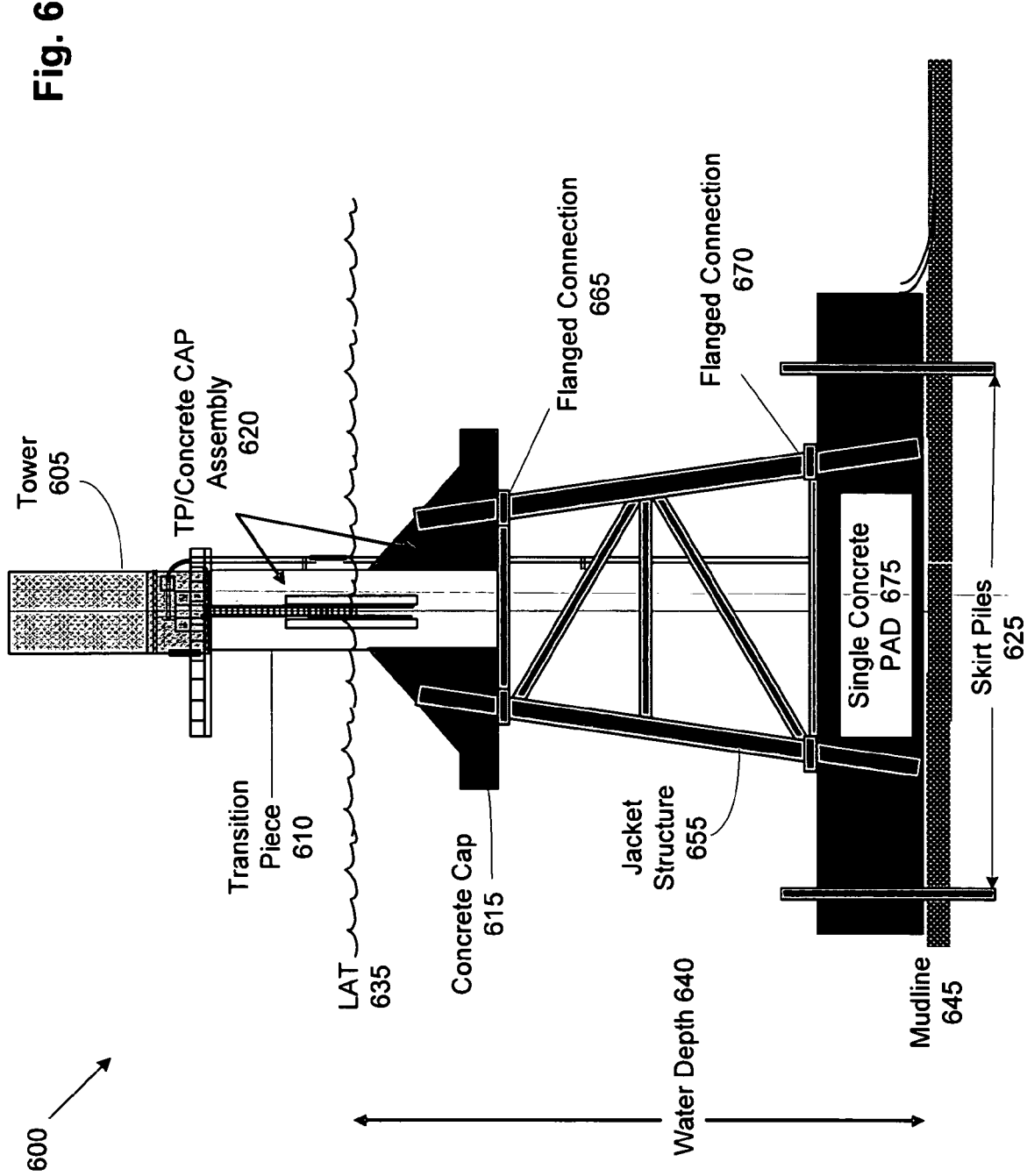
FIG. 6 is an illustration of an embodiment of a wind power plant foundation with a single concrete pad base.

FIG. 6 is an illustration of an embodiment of a wind power plant foundation with a single concrete pad base. In this illustration, a tower 605 of a wind power plant 600 is again mated to a steel or steel/concrete transition piece 610 that transfers loads to a concrete cap (with steel rebar reinforcement) 615, the transition piece 610 and concrete cap 615 forming an assembly 620. The assembly 620 is coupled with a jacket structure 655. The concrete cap 615 may include flanged connections 665 to accept insertion of the tops of the legs of the jacket structure 655 into the concrete cap 615. In an embodiment, the wind power plant 600 is secured in place by a single concrete pad or GBS 675. The concrete pad 675 may also include flanged connections 670 to accept insertion of the bottoms of the legs of the jacket structure 655. The wind power plant 600 may again be placed in a relatively deep water depth 640 from the LAT 635 to the mudline 645.

Figure 7:
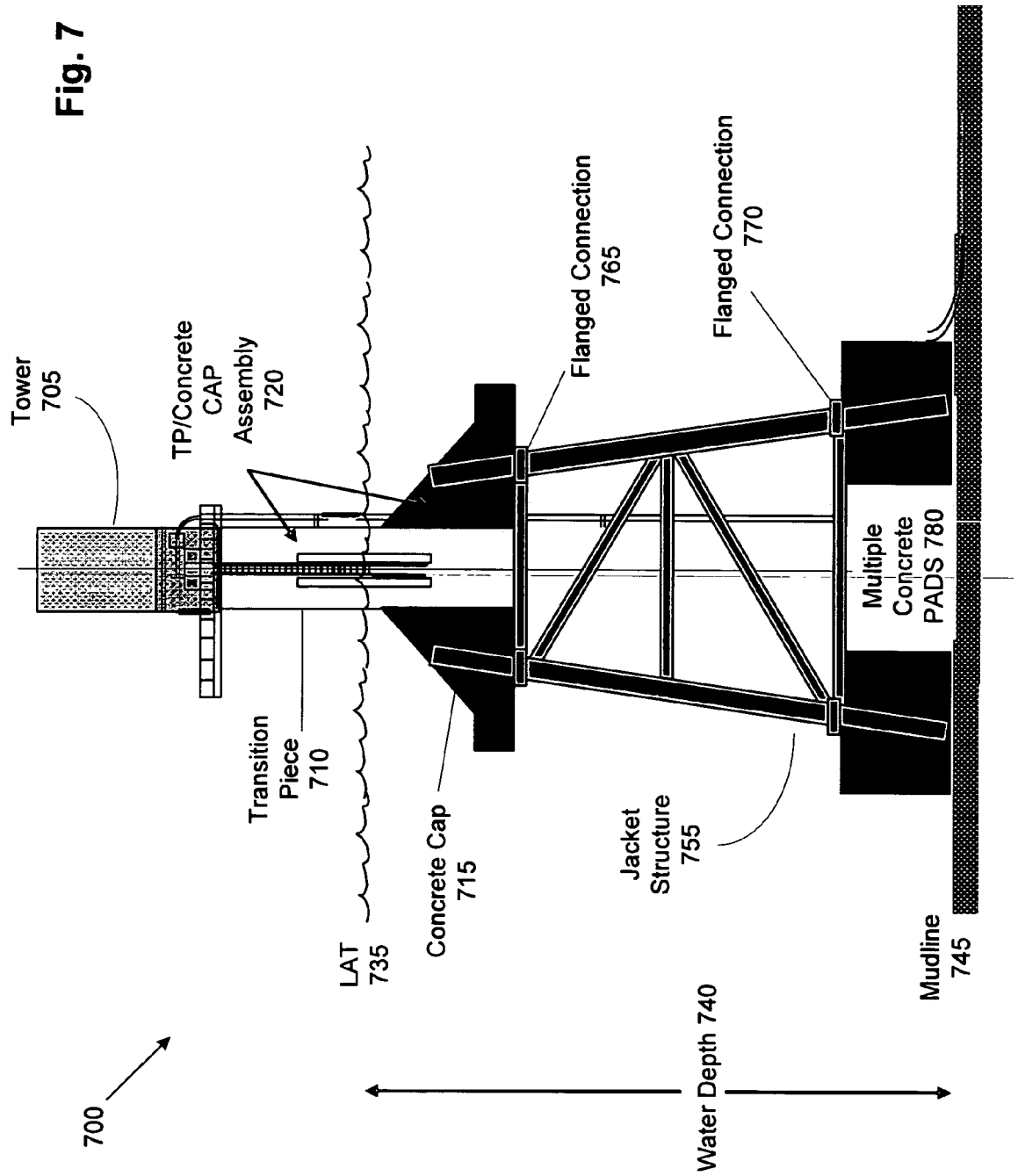
FIG. 7 is an illustration of an embodiment of a wind power plant foundation with a base including multiple concrete pads.

FIG. 7 is an illustration of an embodiment of a wind power plant foundation with a base including multiple concrete pads. In this illustration, a tower 705 of a wind power plant 700 is again mated to a steel or steel/concrete transition piece 710 that transfers loads to a concrete cap (with steel rebar reinforcement) 715, the transition piece 710 and concrete cap 715 forming an assembly 720. The assembly 720 is coupled with a jacket structure 755. The concrete cap 715 may again include flanged connections 765 to accept insertion of the tops of the legs of the jacket structure 755 into the concrete cap 715. In an embodiment, the wind power plant 700 is secured in place by multiple concrete pads 780, such as by a concrete pad for each of the legs of the jacket structure 755. Each concrete pad 775 may also include a flanged connection 770 to accept insertion of the bottom of a leg of the jacket structure 755. The wind power plant 700 may again be placed in a relatively deep water depth 740 from the LAT 735 to the mudline 745.

While FIGS. 5, 6, and 7 have illustrated certain embodiments of a foundation structure, embodiments of the invention are not limited to the illustrated details. Embodiments of the invention are not limited to the base structures shown in such figures, and may be implemented with any base structure, assembly, or mechanism that will secure a jacket structure in place.

Figure 8:
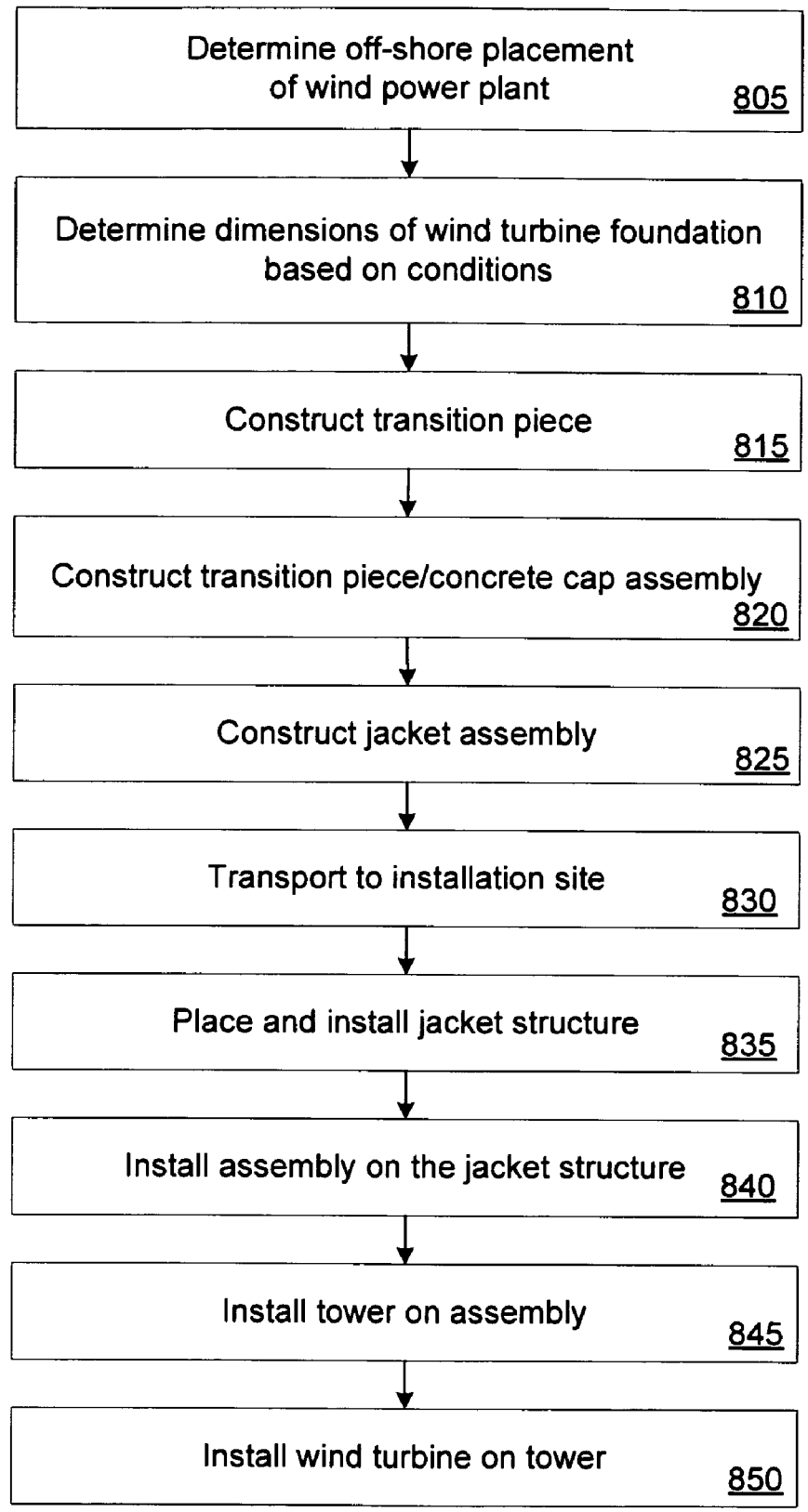
FIG. 8 is a flow chart to illustrate an embodiment of installation of a wind turbine plant.

FIG. 8 is a flow chart to illustrate an embodiment of installation of a wind turbine plant. The flow chart includes general processes in order to illustrate an embodiment of the invention, and is not intended to include every process that may involved in the installation of a wind turbine plant, which may be a very complex undertaking.

In this illustration, an off-shore placement for a wind power plant may be determined 805. In an embodiment, the off-shore placement will have a certain expected water depth. A foundation will be placed beneath the surface of the water to hold the wind power turbine, and the foundation will be coupled with a base assembly or mechanism of some kind. The dimensions of the foundation are determined based on the conditions of the chosen location 810. The conditions that may be considered include, but are not limited to, the type and size of the wind turbine (affecting loading characteristics); the expected wind conditions (affecting wind loading characteristics, and possibly determining the ultimate height of the turbine above the water surface); the water depth (affecting the needed dimensions of the foundation below the water); and the expected wave conditions (affecting wave loading).

A transition piece, generally being made of metal or metal and concrete, then is formed for the wind power plant 815. An assembly is then fabricated using the transition piece and a concrete cap 820. The assembly may be fabricated in climate-controlled conditions at any location, thus minimizing the amount of construction that must be done at the site and that will be done underwater. A jacket structure is then constructed 825, the size, shape, and other construction details being based at least in part on the conditions of the installation site. The foundation elements may then be transported to the installation site 830. At the installation site, the jacket structure may be placed and installed into a base structure 835 and the assembly installed on the jacket structure 840. The tower is installed on the assembly 845, and the wind turbine may then be installed on the tower 850.

While a particular set of processes has been provided for illustration, embodiments of the invention are not limited to these processes to any particular order of execution of such processes. In other embodiments, the wind power turbine may be constructed in different order or in different locations. For simplicity, the portions of the wind power turbine have been described in general, but a wind power plant includes many mechanical and electronic components are not described here.

Figure 9:
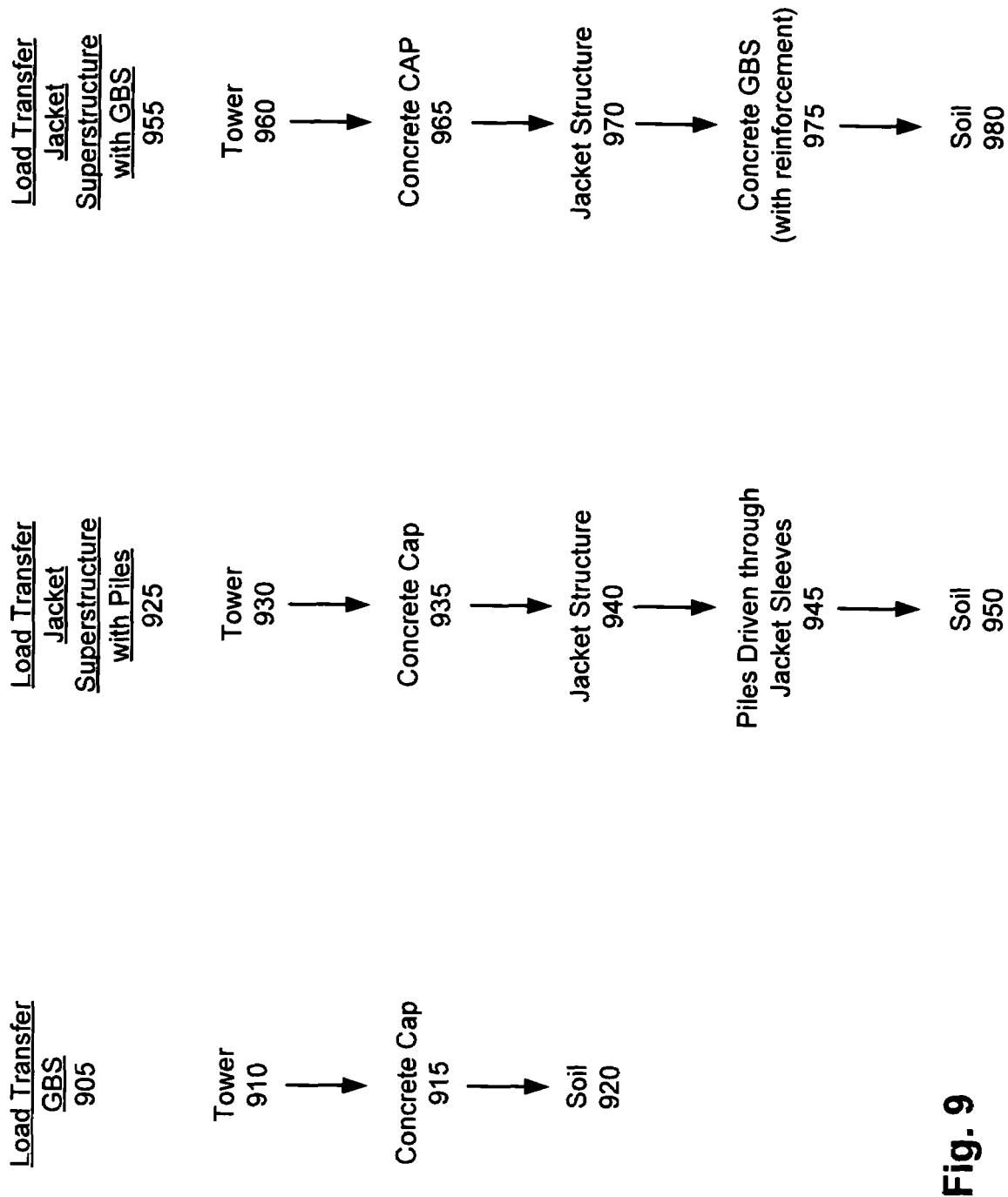
FIG. 9 is an illustration of load transference for embodiments of wind power plants.

FIG. 9 is an illustration of load transference for embodiments of wind power plants. In FIG. 9, the load transfer for a wind power plant having a GBS base 905, such as shown in FIGS. 3 and 4, in shown. For this structure, the loads encountered by the tower 910 are transferred to the concrete cap or GBS 915. The loads encountered by the concrete cap and then transferred to the soil 920.

For a wind power plant having a jacket structure coupled with a pile base 925, such as shown in FIG. 5, the loads of the tower 930 are transferred to the concrete cap 935, which can then transfer loads to the jacket superstructure 940. The loads then may be transferred to the piles of the pile base structure 945 and to the soil 950.

For a wind power plant having a jacket structure coupled with a single concrete base or multiple concrete bases 955, such as shown in FIGS. 6 and 7 respectively, the loads of the tower 960 are again transferred to the concrete cap 965, which can then transfer loads to the jacket superstructure 970. The loads then may be transferred to the concrete GBS(s) 975 and to the soil 980.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A wind power plant comprising:
    a tower, the tower having a top and a bottom;
    an assembly, the assembly comprising a transition piece coupled with a concrete cap, the assembly having a top and a bottom, the top of the assembly being coupled with the bottom of the tower;
    a jacket structure, jacket structure having a top and a bottom and a plurality of legs, the bottom of the assembly being coupled with the top of the jacket structure; and
    a base coupled with the jacket structure, wherein the base comprises a plurality of piles to be driven into the earth.

2. The wind power plant of claim 1, wherein the each pile of the plurality of piles is run through a leg of the jacket structure for driving into the earth.

3. The wind power plant of claim 1, wherein the base comprises a gravity base structure (GBS), the legs of the jacket structure being coupled with the GBS.

4. The wind power plant of claim 3, wherein the GBS comprises a skin, the base further comprising one or more piles installed through the skirt of the GBS.

5. The wind power plant of claim 3, wherein the base comprises a plurality of gravity base structures (GBSs), each leg of the jacket structure being coupled with one of the GBSs.

6. The wind power plant of claim 1, wherein the jacket structure includes a metal lattice.

7. The wind power plant of claim 1, wherein the assembly comprises a flange, the top of a leg of the jacket structure passing through the flange to couple with the assembly.

8. The wind power plant of claim 1, further comprising a wind turbine coupled with the top of the tower.

9. A method for installation of a wind power plant comprising:

fabricating an assembly, the assembly including a cap and a transition piece;

fabricating a jacket structure;

placing a jacket structure in a offshore location wholly or partially underwater and securing a bottom of the jacket structure to a base, wherein the base comprises a plurality of piles, and wherein securing the jacket structure to the base comprises running the piles through the jacket structure to drive the piles into the earth; and coupling the assembly to a top of the jacket structure.

10. The method of claim 9, further comprising coupling a tower with the assembly.

11. The method of claim 10, further comprising coupling a wind power turbine to the tower.

12. The method of claim 9, wherein the cap is comprised primarily of concrete.

13. The method of claim 9, wherein the transition piece is comprised primarily of metal.

14. The method of claim 9, wherein fabricating the assembly comprises fabricating the assembly onshore, and further comprising transporting the fabricated assembly to the offshore location.

15. The method of claim 9, wherein the base comprises one or more gravity base structures (GBSs), and wherein securing the jacket structure to the base comprises coupling the jacket structure to the GBSs.

16. A wind power plant comprising:

a means for generating electrical power from wind energy;

a means for suspending the means for generating electrical power, the means for suspending being wholly or partially submerged in a body of water; and a means for securing the wind power plant in a location, the means for securing being coupled with the means for suspending, wherein the means for securing secures the wind power plant using structures driven into the earth.

17. The wind power plant of claim 16, wherein the means for suspending includes an assembly comprising a concrete cap means and a transition piece means.

18. The wind power plant of claim 16, wherein the means for suspending includes a metal lattice means, the metal lattice means being coupled with the means for securing.

19. The wind power plant of claim 16, wherein the means for securing secures the wind power plant using the mass of the means for securing.

* * * * *